US010759646B2

(12) United States Patent
Jarisch et al.

(10) Patent No.: US 10,759,646 B2
(45) Date of Patent: Sep. 1, 2020

(54) INSTANT TUBE HEATER WITH HOMOGENOUS TEMPERATURE CONTROL

(71) Applicant: Nestec S.A., Vevey (CH)

(72) Inventors: Christian Jarisch, Lutry (CH); Minh Quan Phan, Bussigny (CH); Fausto Di Muzio, Pully (CH)

(73) Assignee: Societe des Produits Nestle S.A., Vevey (CH)

( * ) Notice: Subject to any disclaimer, the term of this patent is extended or adjusted under 35 U.S.C. 154(b) by 473 days.

(21) Appl. No.: 15/324,129

(22) PCT Filed: Jul. 28, 2015

(86) PCT No.: PCT/EP2015/067238
§ 371 (c)(1),
(2) Date: Jan. 5, 2017

(87) PCT Pub. No.: WO2016/016225
PCT Pub. Date: Feb. 4, 2016

(65) Prior Publication Data
US 2017/0217751 A1    Aug. 3, 2017

(30) Foreign Application Priority Data

Jul. 29, 2014  (EP) .................................... 14178954

(51) Int. Cl.
*B67D 3/00* (2006.01)
*F24H 1/12* (2006.01)
(Continued)

(52) U.S. Cl.
CPC .......... *B67D 3/0022* (2013.01); *A47J 31/542* (2013.01); *A47J 31/56* (2013.01); *F24H 1/105* (2013.01);
(Continued)

(58) Field of Classification Search
USPC ......................................................... 392/397
See application file for complete search history.

(56) References Cited

U.S. PATENT DOCUMENTS 5,334,819 A  *  8/1994  Lin ......................... F24H 1/121
                                                        219/628
5,868,062 A  *  2/1999  Enomoto .............. A47J 31/002
                                                        99/282
(Continued)

FOREIGN PATENT DOCUMENTS

CN          203301764 U      11/2013
DE    102006060750 A1  *  6/2008  ............ A47J 31/542
(Continued)

OTHER PUBLICATIONS

CN Application No. 201580037857.3; Nestec S.A.; Jul. 28, 2015; Office Action dated Oct. 2, 2018.
(Continued)

*Primary Examiner* — Dana Ross
*Assistant Examiner* — Kuangyue Chen
(74) *Attorney, Agent, or Firm* — K&L Gates LLP (57) ABSTRACT

An instant tube heater for heating flowing liquid is disclosed that includes at least a hollow heating tube, an inlet connector, an outlet connector, and a temperature sensor. Also disclosed is a beverage preparation machine that includes the instant tube heater.

18 Claims, 9 Drawing Sheets

(51) Int. Cl.
  *A47J 31/56* (2006.01)
  *H05B 1/02* (2006.01)
  *A47J 31/54* (2006.01)
  *F24H 1/10* (2006.01)
  *F24H 9/12* (2006.01)
  *H05B 3/06* (2006.01)
  *H05B 3/46* (2006.01)
  *H05B 3/04* (2006.01)

(52) U.S. Cl.
  CPC ............ *F24H 1/121* (2013.01); *F24H 9/128* (2013.01); *H05B 1/0297* (2013.01); *H05B 3/04* (2013.01); *H05B 3/06* (2013.01); *H05B 3/46* (2013.01); *H05B 2203/013* (2013.01)

(56) References Cited

U.S. PATENT DOCUMENTS

| | | | | |
|---|---|---|---|---|
| 8,636,174 | B1* | 1/2014 | Motkowski | B67D 1/1295 222/1 |
| 2007/0012685 | A1* | 1/2007 | Gourand | A47J 31/542 219/628 |
| 2008/0164330 | A1* | 7/2008 | Wei | F16K 11/0743 236/12.1 |
| 2008/0264264 | A1* | 10/2008 | Morgandi | A47J 31/56 99/281 |
| 2010/0193544 | A1 | 8/2010 | Rusch et al. | |
| 2011/0004994 | A1* | 1/2011 | Le | A61H 33/005 4/541.1 |
| 2011/0116776 | A1* | 5/2011 | Wheeler | F24H 1/121 392/441 |
| 2011/0146800 | A1* | 6/2011 | Jallon | C02F 9/005 137/1 |
| 2011/0186161 | A1* | 8/2011 | Chen | E03C 1/057 137/637 |
| 2012/0148220 | A1* | 6/2012 | Koga | F24H 1/102 392/485 |
| 2015/0082990 | A1* | 3/2015 | Wang | A47J 31/56 99/281 |
| 2015/0117846 | A1* | 4/2015 | Kohl | H05B 3/24 392/479 |
| 2016/0309763 | A1* | 10/2016 | Jetton | A47J 43/04 |
| 2017/0127877 | A1* | 5/2017 | Guegan | A47J 31/545 |
| 2017/0217751 | A1* | 8/2017 | Jarisch | A47J 31/542 |
| 2017/0241665 | A1* | 8/2017 | Wedam | B22D 17/24 |

FOREIGN PATENT DOCUMENTS

| | | |
|---|---|---|
| DE | 102006060750 A1 | 6/2008 |
| FR | 2855359 A1 | 11/2004 |
| WO | 2012090091 A1 | 7/2012 |

OTHER PUBLICATIONS

International Search Report, dated Nov. 4, 2015, in PCT/EP2015/067238, filed Jul. 28, 2015.
Written Opinion of the International Searching Authority, dated Nov. 4, 2015, in PCT/EP2015/067238, filed Jul. 28, 2015.

* cited by examiner

SECTION D-D
FIG. 10

SECTION C-C
FIG. 16

INSTANT TUBE HEATER WITH HOMOGENOUS TEMPERATURE CONTROL

CROSS REFERENCE TO RELATED APPLICATIONS/INCORPORATION BY REFERENCE STATEMENT

This application is a US national stage application filed under 35 USC § 371 of International Application No. PCT/EP2015/067238, filed Jul. 28, 2015; which claims priority to Application No. EP 14178954.5, filed Jul. 29, 2014. The entire contents of the above-referenced application are hereby expressly incorporated herein by reference.

TECHNICAL FIELD

The presently disclosed and/or claimed inventive concept(s) relates generally to an instant tube heater providing a homogenous temperature distribution which improves the heat exchange between the heating means and the liquid to be heated and promotes accuracy of the temperature. The presently disclosed and/or claimed inventive concept(s) also relates to a beverage preparation machine comprising the instant tube heater.

BACKGROUND

Instant tube heaters are known in the field of beverage dispensers such as water dispensers or coffee capsule machine and the like. The advantage consists in heating quickly, repeatedly and economically liquid on demand, for example, for brewing a beverage from a single dose of beverage ingredients contained in a capsule or pod. The heater tube is economical since it essentially heats only the volume of liquid required as it traverses the heating tube. The tube heater has a low mass of inertia and does not need any significant pre-heating time. Therefore, the preparation of a hot beverage is speedier and requires less energy compared to a boiler or a thermo-block.

U.S. Pat. No. 4,975,559 relates to a device for heating and aerating water in a coffee machine. The water circuit has water circulation channels and air retaining pockets disposed at intervals along the water circulation channels above the normal water levels of the channels. The air retaining pockets provide turbulence in circulating water and cause the air retained in the pockets to be dissolved in the water.

US2006027103A1 relates to a device for heating liquid in a beverage machine. The device comprises a tube heater with a water inlet, a water outlet and an insert inside the tube comprising helical grooves. The water is forced through a small gap in helical manner. One problem is that water temperature is difficult to control and can be over-heated. This requires a complex set of resistors which are electrically linked. Furthermore, the inside insert provides an elevated pressure loss in the fluid circuit that needs to be overcome.

In particular, an instant tube heater can comprise a glass tube coated with an electro-thermal film. For example, Chinese utility model CN202636656 (U) provides a heating body assembly for instant water dispensers and water boilers. The heating body assembly comprises a water inlet end and a water outlet end, wherein a heating tube is arranged between the water inlet end and the water outlet end. The heating body assembly is characterized in that the heating tube is a single tube having an outer diameter of 20-25 mm, a length of 180-230 mm and a power of 1800-2800 W.

Generally, the temperature regulation is obtained by the control unit of the beverage machine sensing the temperature with a NTC sensor directly at the water flow outlet and powering the heating tube on and off accordingly.

It has been found that the temperature in the heating tube is not homogeneous but forms a gradient from the centerline of the tube towards its periphery. Generally, since the liquid flow is laminar, the liquid flowing in the centre of the tube is cooler than the liquid flowing adjacent the tubular wall of the tube. Since the NTC sensor preferentially measures the temperature coming from the centre of the tube, the temperature regulation is poor since the measured temperature is systematically too low. Moving the NTC sensor relative to the tube (towards the hotter region of the temperature gradient) does not provide a better regulation.

In addition, since the sensed temperature is lower than the real average temperature of liquid, the tube tends to be over-heated which thus creates a cushion of steam between the heating tube and the liquid inside. This small insulation area reduces drastically the heat efficiency of the tube heater.

BRIEF DESCRIPTION OF THE DRAWINGS

Other particularities and advantages of the presently disclosed and/or claimed inventive concept(s) will also emerge from the following description. In the accompanying drawings, given by way of non-limiting examples:

DETAILED DESCRIPTION

The presently disclosed and/or claimed inventive concept(s) aims at solving the aforementioned problems.

For this, the presently disclosed and/or claimed inventive concept(s) relates to an instant tube heater for heating flowing liquid comprising a hollow heating tube comprising a tubular flow passage for heating liquid as liquid flows through it. The tubular flow passage extends along a central axis. The instant tube heater also comprises an inlet connector sealingly connected to an inlet end of the hollow heating tube and an outlet connector sealingly connected to an outlet end of the hollow heating tube. It advantageously further comprises at least one temperature sensor. The temperature sensor is preferentially connected to the outlet connector for sensing the temperature of liquid leaving the heating tube. According to an aspect of the presently disclosed and/or claimed inventive concept(s), the instant tube heater comprises locally an inlet flow deviating member which is positioned locally at the inlet end of the heating tube and which is configured for forcing the flow of liquid entering the tubular passage of the heating tube in at least one direction away from the direction of the central axis of the tubular passage.

More particularly, the inlet flow deviating member comprises at least one wall arranged transversally to the direction of the central axis comprising at least one through-opening extending along a direction that is neither aligned nor parallel to (or differ from) the direction of the central axis. The inlet flow deviating member is thereby configured for deviating the flow of liquid entering the tubular passage of the heating tube from the direction of the said central axis.

In certain non-limiting embodiments, the tube heater comprises an inlet flow deviating member arranged for dividing the flow into multiple flow streams and forcing these streams in multiple directions away from the direction of the central axis of the tubular passage.

The inlet flow deviating member is arranged "locally" meaning that it extends only at the inlet end of the tubular flow passage and therefore along a limited axial portion of the tubular flow passage. In particular, this limited axial portion is less than 10%, such as (but not limited to) less than 5%, of the total axial length of the tubular passage. In particular, outside the inlet end and outlet end of the tubular passage, the tubular passage is free of flow interfering or hindering (i.e. transversal) obstacles. Therefore, the flow of liquid can homogenize in the tubular passage and the pressure loss in the tube heater is also minimized.

The inlet flow deviating member is therefore configured to force the laminar flow of the liquid entering in the flow passage of the heating tube into one or many directions which differ from the axial direction in the flow passage of the tube so that the liquid does not flow strictly along the axial direction of the passage of the heating tube. More particularly, the liquid is moved such that the layer of liquid in contact with the heating surface is constantly renewed as the liquid flows through the passage. Consequently, the gradient of temperature between the centerline and the heating surface of the tube is reduced or eliminated.

In certain non-limiting embodiments, the flow deviating member comprises a wall which extends transversally relative to the central axis (or centerline) of the heating tube and which comprises a plurality of inlet flow through-openings. The flow deviating member can be a solid heat resistant plastic (e.g., injected) or metal insert which is perforated by these through-openings and which are, in certain non-limiting embodiments, tubular. It could also be a metal and/or polymer lattice or grid, for instance.

In a particular (but non-limiting) aspect, the inlet flow through-openings are directed in many different directions neither aligned nor parallel to the direction of the central axis. In certain particular (but non-limiting) embodiments, the inlet flow through-openings are directed in many different directions diverging from the direction of the central axis towards the inner surface of the heating tube and/or converging with the central axis. As a particular (but non-limiting) example, most of the through-openings are directed in a diverging fashion from the direction of the central axis of the passage.

In one aspect, most, and in certain non-limiting embodiments all, of the through-openings are off-centered and further oriented along directions which are inclined relative to the centrally and axially extending axis and relative to radial planes of the tube. This particular orientation of the openings promotes a swirling motion of the flow of liquid in the heating passage; thereby renewing the layers of liquid flowing through the passage while also minimizing the flow resistance.

In a particular but non-limiting configuration, the inlet flow through-openings comprise a plurality of entry hole areas distributed at its entry side along a first circle of first diameter and a plurality of exit hole areas distributed at its exit side along a second circle of second diameter larger than the diameter of the first circle.

The number of flow through-openings may vary. In a particular (but non-limiting) way, the number of flow through-openings is, in certain non-limiting embodiments, comprised between 2 and 20, such as (but not limited to) between 3 and 10. In another non-limiting aspect, the instant tube heater preferably further comprises mixing means between the heating tube and the temperature sensor. The mixing means contributes to homogenize the temperature of the liquid which is sensed by the temperature sensor as it leaves the heating tube.

More particularly, the mixing means comprises at least an outlet flow perturbing member. This flow perturbing member acts to hinder the liquid flow coming from the tubular passage. This outlet flow perturbing member thereby contributes to creating turbulence of the flow of heated liquid leaving the heating tube such that the temperature is further homogenized.

In certain non-limiting embodiments, the outlet flow perturbing member comprises a wall extending transversally to the central axis and comprising plurality of outlet flow through-openings. Such outlet flow perturbing member is positioned at the outlet end of the heating tube. The flow through-openings may form a localized reduced flow area for the liquid leaving the heating tube compared to the flow area of the passage positioned upstream of the flow perturbing member.

In particular, the temperature sensing of the homogenized hot liquid becomes more accurate and, as a result, the temperature regulation is improved and so is too the overall efficiency of the heater.

In particular, the outlet flow perturbing member extends transversally, such as (but not limited to) conically, relative to the direction of the central axis. For example, the outlet flow perturbing member can be a solid heat resistant plastic (e.g., injected) or metal insert, e.g., which is perforated by these flow through-openings which are tubular in certain non-limiting embodiments. The outlet flow perturbing member can also be a metal and/or polymer lattice or grid, for instance.

In a particular (but non-limiting) aspect, a mixing chamber for the heated liquid is provided between the outlet flow perturbing member and the outlet connector. The mixing chamber enables liquid to continuously mix and homogenize before leaving the tube heater.

This combination of the outlet flow perturbing member and mixing chamber form a "static mixer" for the flow. However, it could be envisaged to have a "dynamic" mixing means such as a moving or rotating blade or stirrer that is moved or propelled by the flow of liquid itself.

In certain non-limiting embodiments, the temperature sensor is positioned to extend at least partially inside the mixing chamber. However, this is not absolutely mandatory and the temperature sensor could as well be positioned further downstream such as inside the external connection portion of the outlet connector.

In certain non-limiting embodiments, some, and in particular (but non-limiting) embodiments most, of the outlet flow through-openings are directed in many different directions converging with the temperature sensor and/or with the centre of the mixing chamber. Again, this configuration ensures liquid temperature homogeneity, in particular that the outermost layer of liquid in contact with the heating surface of the tube, notably at the end of the tube that may have been over-heated locally, can be mixed with lower temperature liquid.

More specifically, the outlet flow through-openings comprise entry hole areas distributed in a first circle of first diameter and exit hole areas distributed in a second circle of second diameter smaller than the diameter of the first circle.

The number of flow through-openings of the outlet flow perturbing member may vary. In a particular (but non-limiting) way, the number of flow through-openings is comprised between 2 and 30, such as (but not limited to) between 3 and 15.

In certain non-limiting embodiments, the heating tube is a glass tube coated with material(s) having resistance heating properties such as an electro-thermal film. Alternatively, the heating tube can be a thick film.

In certain non-limiting embodiments, the tube heater further comprises an outer casing connected respectively to the inlet and outlet connectors and separated from the heating tube by an annular gap. The casing provides proper heat insulation for safety and efficiency of the heater.

The presently disclosed and/or claimed inventive concept(s) further relates to a beverage preparation machine comprising an instant tube heater as aforementioned. In certain particular (but non-limiting) embodiments, the beverage machine comprises an ambient or cold liquid supply line comprising a liquid supply pump connected to a reservoir of liquid, such as a water tank, or other supply of liquid, and a heated liquid supply line connected to a beverage preparation chamber, such as a capsule or pod receiving chamber; wherein the inlet connector of said instant tube heater is sealingly connected to the ambient or cold liquid supply line and the outlet connector of said instant tube heater is sealingly connected to the heated liquid supply line; the machine further comprising a control unit arranged for receiving temperature input from the temperature sensor and for controlling the liquid supply pump as a result of the temperature input.

The following description will be given with reference to the above-mentioned figures.

The terms "inlet", "outlet", "entry", "exit", "upstream" and "downstream" are utilized in the text to indicate a configuration of the device by reference to the relative sense of the flow of liquid during the operations of the tube heater.

The instant tube heater 1 of the presently disclosed and/or claimed inventive concept(s) generally comprises a hollow heating tube 2, an inlet connector 3 and an outlet connector 4. Both inlet and outlet connectors are arranged for enabling liquid communication of the heater with external flow conduits (not represented) of a beverage preparation machine. In certain non-limiting embodiments, the inlet connector 3 is sealingly connected to an inlet end 21 of the hollow heating tube 2. Similarly, the outlet connector 4 is sealingly connected to an outlet end 22 of the heating tube.

The connection between the inlet and outlet connectors 3, 4 and the tube 2 can be described in more detail as follows considering many other alternative connections are possible. Each connector 3, 4 can be identical in order to reduce the number of pieces and so facilitate the assembling of the instant tube heater as well as reduce the production costs. Each connector 3, 4 has a tubular connection portion 31, 41 which engages a sealing ring 32, 42, for example of elastomer or silicone, which is itself snugly fitted with the inlet and outlet ends 21, 22 of the heating tube respectively. An outer ring portion 33, 43, preferably of solid heat resistant polymer in certain non-limiting embodiments, is also provided to secure the tubular connection portion 31, 41 with the ring 32, 42. On the free end of the connector, is provided an external connection portion 34, 44 which is arranged for receiving the external connection of a conduit and the like (not illustrated).

Figure 1:
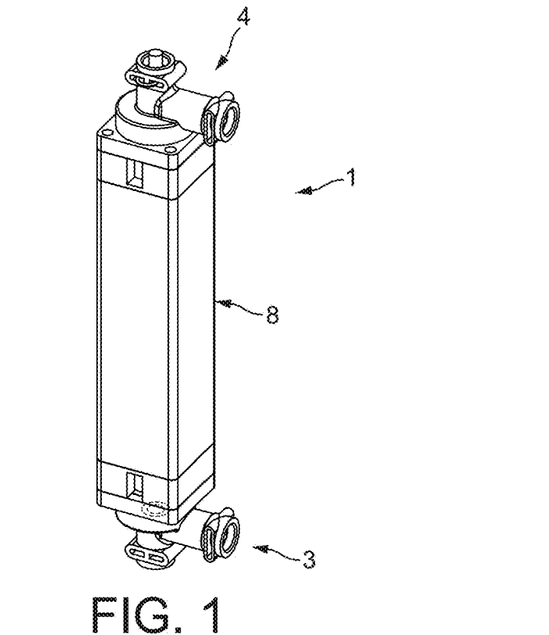
FIG. 1 shows a perspective view of an instant tube heater according to a particular (but non-limiting) mode of the presently disclosed and/or claimed inventive concept(s)
Figure 2:
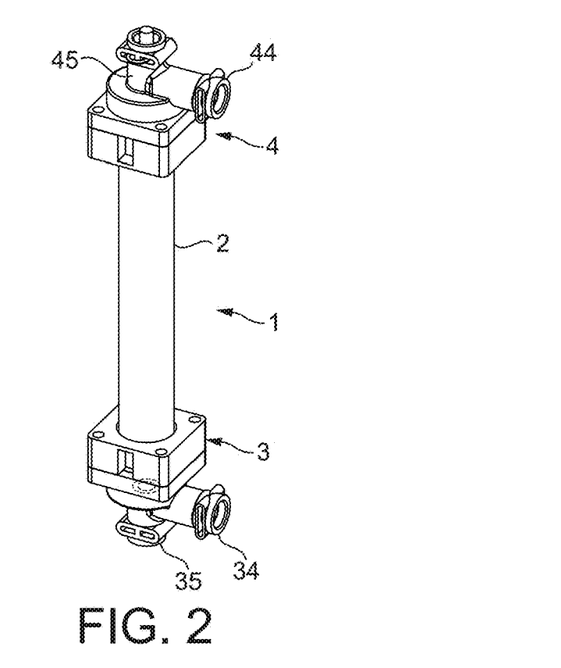
FIG. 2 shows the instant tube heater with its outer casing being removed.
Figure 3:
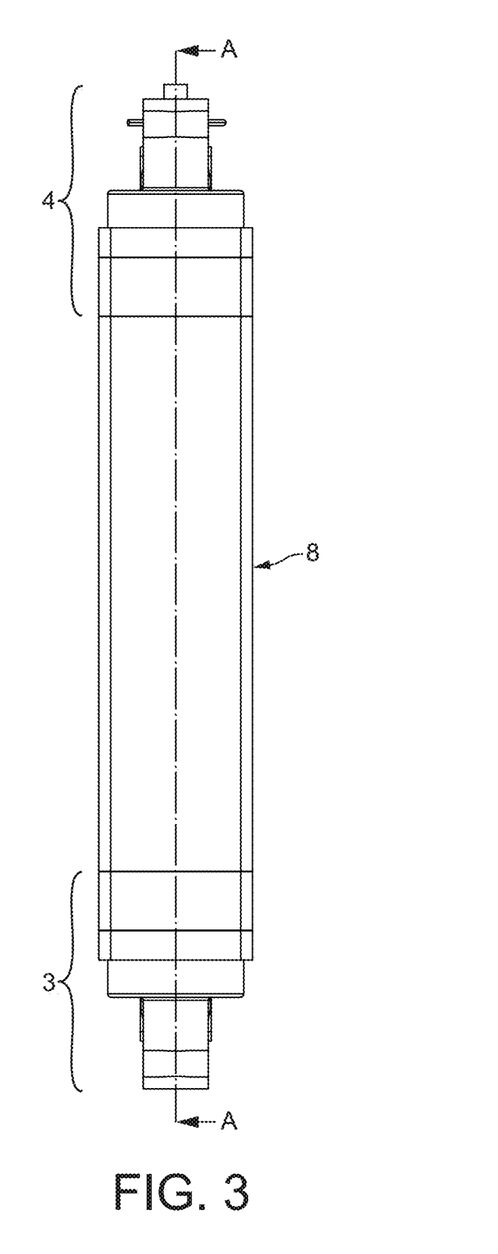
FIG. 3 shows a side view of the instant tube heater of FIGS. 1 and 2.

An outer casing 8 is provided between the inlet connector and the outlet connector. The outer casing is generally rigid and formed of heat insulating material such as heat resistant polymer. A free gap 80 is maintained between the casing and the outer surface of the heating tube. However, the outer casing can be omitted as illustrated in FIG. 2 whereas for safety reasons, its presence is highly recommended. In the particular (but non-limiting) mode, as illustrated, the casing is mounted and secured by the two outer ring portions 33, 43. The free gap can be occupied simply by gas or, alternatively, be filled with a resistant and heat insulating and heat resistant, lightweight material such as foam or fibres.

The hollow heater tube 2 generally comprises a tubular flow passage 20 which extends along the central axis I of the tube and has a certain diameter which is generally dimensioned commensurate with the intended liquid flow rate and/or the heating power of the hollow tube heater.

The tube heater comprises a temperature sensor 5, such as (but not limited to) an NTC probe or any equivalent temperature sensing means. The temperature sensor is positioned and secured at or close to the liquid outlet end 22 of the heating tube 2. In particular, the sensor may be attached to the outlet connector 4, such as through a sensor receiving portion 45 by means of a tightening spring 46 or the like. The sensor or probe thereby extends along the central axis I towards the interior of the heating tube a certain length. It should be noted that the sensor could also be positioned differently, for instance, inside the external connection portion 44. Incidentally, the inlet connector 3 which is, in certain non-limiting embodiments, identical to the outlet connector 4, may also comprise a sensor receiving portion 35. This portion may be or may not be occupied by a temperature sensor. In case, no temperature sensor is present, the passage in the portion 35 is liquid imperviously closed by a closing gate 36, for instance, secured in place by the tightening spring 37 or the like.

According to an aspect of the presently disclosed and/or claimed inventive concept(s), an inlet flow deviating member 6 is positioned at the inlet end 21 of the heating tube to directionally guide the flow of liquid entering in the heating tube, and in particular, into the flow passage 20. The inlet flow deviating member is configured to break the flow of liquid entering into the heating tube in order to create a turbulent mode of the flow inside the tube that favours the temperature transfer as well as the homogeneity of the temperature of liquid. The inlet flow deviating wall member can be fitted inside the tube such as through the sealing ring 32. Immediately downstream of the inlet flow deviating member 6, the flow of liquid remains essentially unhindered in certain non-limiting embodiments so that liquid can freely flow and occupy the volume of the tubular flow passage 20. The function of the inlet flow deviating member 6 is therefore essentially to create turbulence of the liquid flowing in the passage in such a manner that all the liquid will contact the tubular heating surfaces as it travels to the outlet end and consequently, the formation of a gradient of temperature in the liquid is successfully reduced or prevented. The device of the presently disclosed and/or claimed inventive concept(s) has also a scale reducing effect as the temperature difference at the tube wall is reduced.

In a particular (but not limiting) mode, the inlet flow deviating member 6 extends transversally relative to the central axis I of the heating tube and comprises a plurality of inlet flow through-openings 60. In certain non-limiting embodiments, the flow through-openings extends in many different directions. In certain particular non-limiting embodiments, those directions O1, O2, O3, O4, O5, O6 diverge from the direction of the central axis I, towards the inner surface of the heating tube. Additionally or alternatively, flow through-openings could be directed in directions converging with the central axis I (these possible modes are not represented).

This divergence and/or convergence of the liquid streams, resulting from this orientation of the through-openings, ensure that the liquid does not enter the heating passage as one unidirectional flow stream or multiple unidirectional flow streams that would rather promote a laminar behavior, more prone to create a temperature gradient inside the heating tube.

Figure 5:
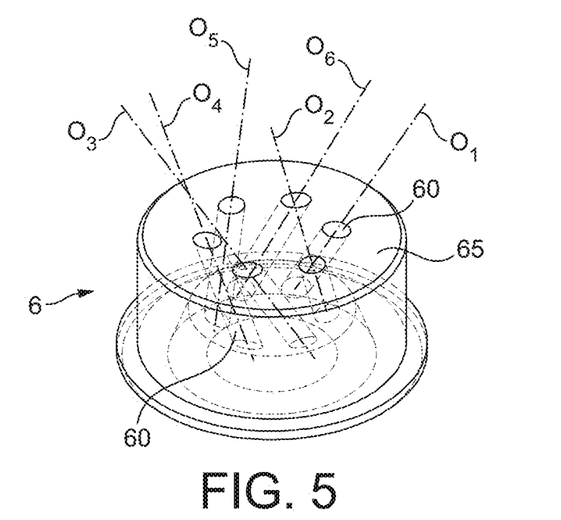
FIG. 5 is a perspective and top oriented view (i.e., exit side) of the inlet flow deviating member of the tube heater.
Figure 6:
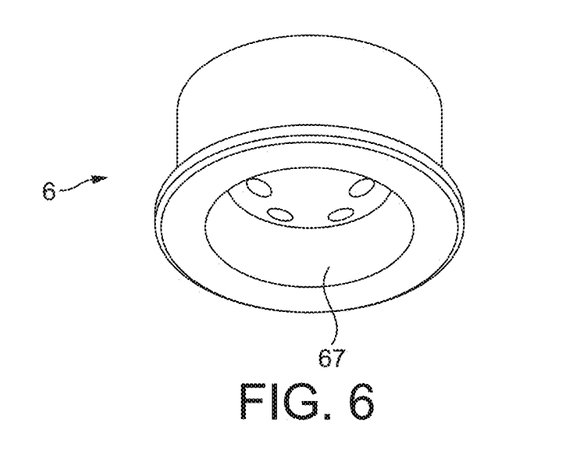
FIG. 6 is a perspective and bottom oriented view (i.e., entry side) of the inlet flow deviating member of the tube heater.
Figure 8:
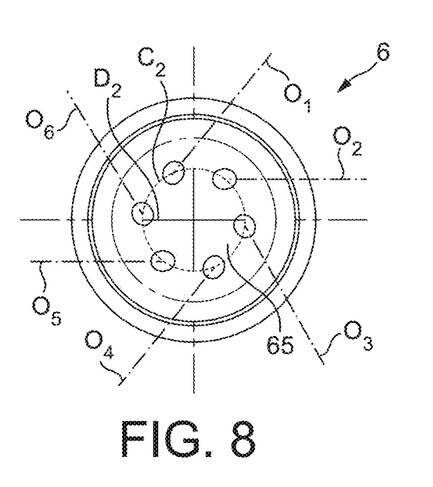
FIG. 8 is a plane view of the exit side of the inlet flow deviating member.
Figure 9:
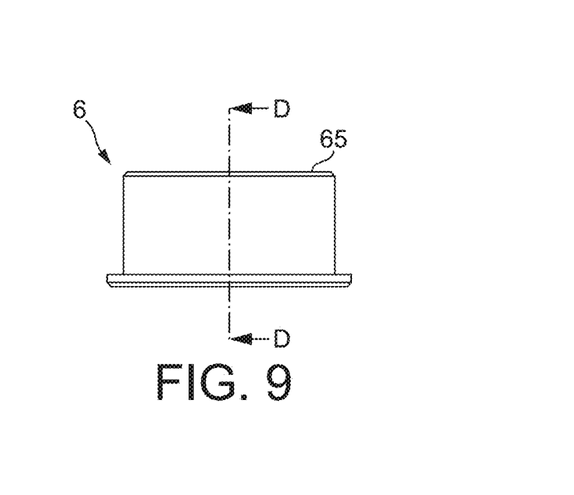
FIG. 9 is a side view of the inlet flow deviating member.
Figure 10:
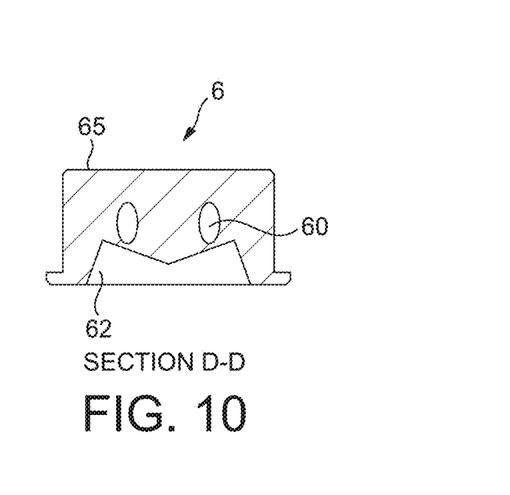
FIG. 10 is a cross-section view D-D of the inlet flow deviating member.
Figure 11:
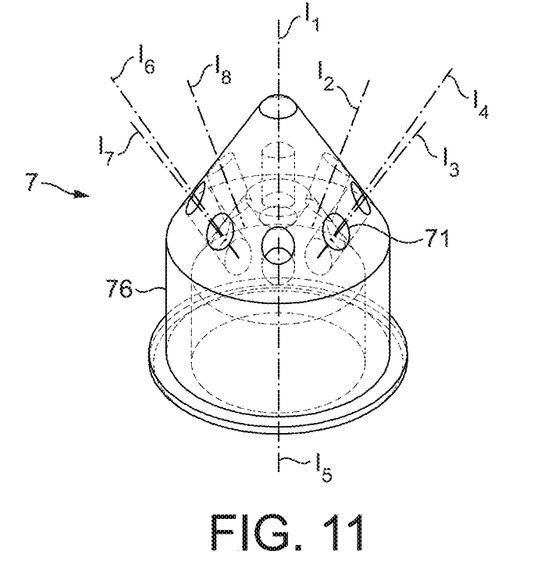
FIG. 11 is a perspective view and top view (i.e., entry side) of the outlet flow perturbing member.
Figure 12:
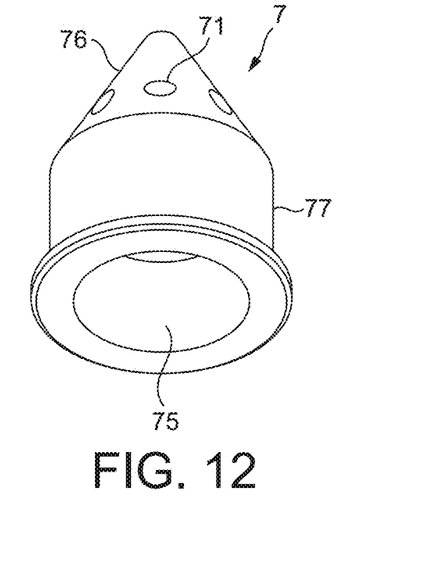
FIG. 12 is a perspective and bottom view (i.e., exit side) of the outlet flow perturbing member.
Figure 13:
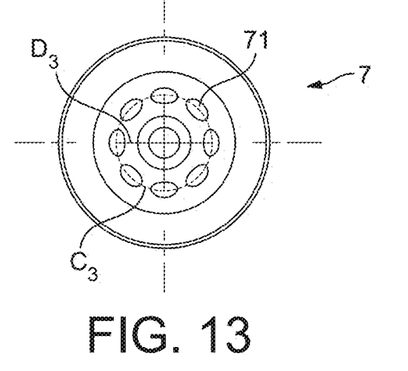
FIG. 13 is a plane view of the exit side of the outlet flow perturbing member.
Figure 14:
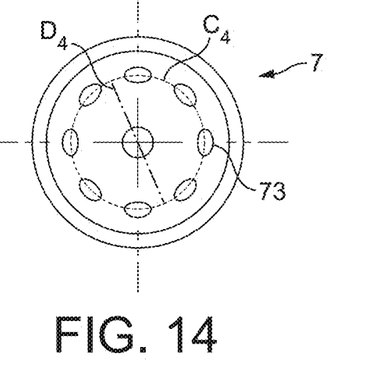
FIG. 14 is a plane view of the entry side of the outlet flow perturbing member.
Figure 15:
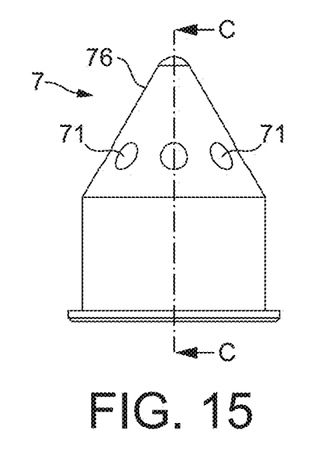
FIG. 15 is a side view of the outlet flow perturbing member.
Figure 16:
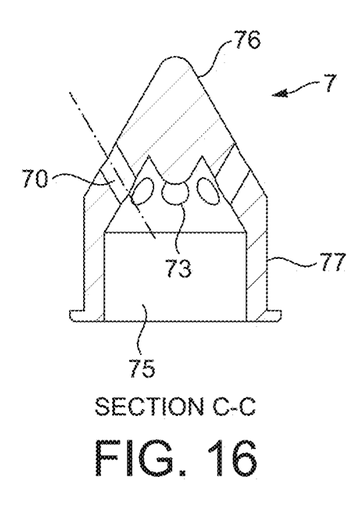
FIG. 16 is a cross sectional view C-C of the outlet flow perturbing member.
Figure 17:
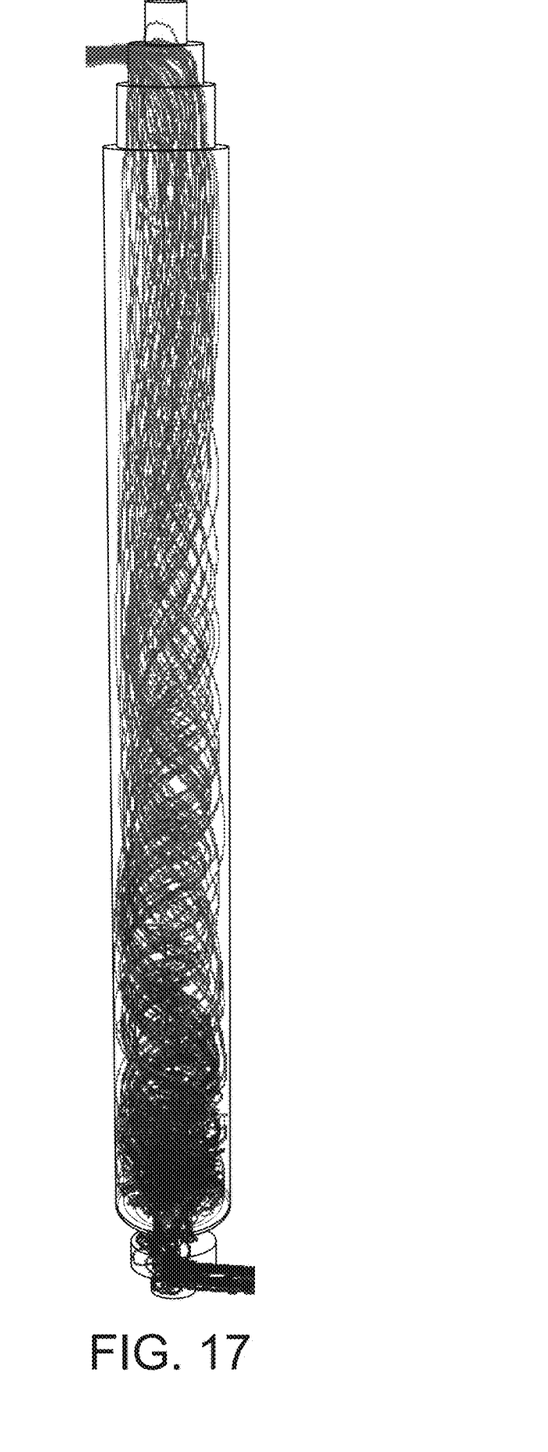
FIG. 17 shows a flow simulation model of the tube heater of the presently disclosed and/or claimed inventive concept(s) with an inlet flow deviating member as illustrated in FIGS. 5-10 (without outlet flow perturbing member)

More particularly, at least some, and in certain non-limiting embodiments all, through-openings 60 are off-centered and further oriented along directions which are inclined relative to the axial direction and relative to radial planes of the tube as illustrated in FIGS. 5 and 8. As a result, a swirl movement (and turbulence) of the flow is created as it is illustrated by the multitude of flow lines materialized by the computerized flow simulation model in FIG. 17. It should be noticed that the flow lines do not necessarily correspond to the number of divided flow streams created by the through-openings.

Figure 7:
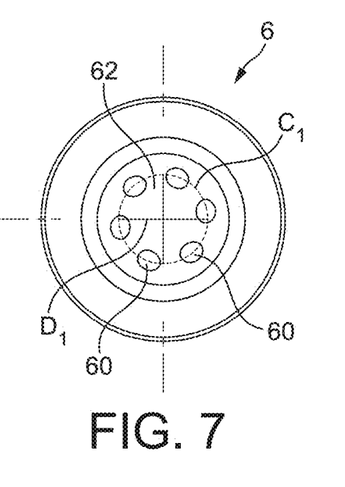
FIG. 7 is a plane view of the entry side of the inlet flow deviating member.

More particularly, the through-openings further comprise a plurality of entry hole areas (i.e., at the surface of the entry of the inlet flow deviating member as shown in FIG. 7) distributed at its entry side 62 along a first circle C1 of diameter D1 and comprises a plurality of exit hole areas (i.e., at the surface of the exit of the inlet flow deviating member as shown in FIG. 8) distributed at its exit side 65 along a second circle C2 of diameter D2 larger than the diameter D1 of the first circle at the entry hole areas. In certain non-limiting embodiments, the diameters of the holes are equal or higher than the diameter of the inlet end to not create an artificial restriction of the flow.

Of course, it can be possible to have the hole areas provided at the entry side and/or the exit side of the inlet flow deviating member positioned randomly or under a geometrical distribution different from a circle. Also, the transversal cross section of the through-openings can be of different shape. In the illustrated mode, the transversal cross section is cylindrical but it could be oval, rectangular or the through-openings could be slanted slits or slots of linear or curved shape.

The inlet flow deviating member 6 could also be an integral part of the inlet connector 3, in particular, be integral to the tubular connection portion 31.

In order to further improve the accuracy of the temperature sensing, the instant tube heater 1 further comprises a flow mixing means between the outlet end and the temperature sensor.

In a particular (but non-limiting) mode, the mixing means may comprise an outlet flow perturbing member 7 which is positioned at or close to the outlet end 22 of the heating tube.

In certain non-limiting embodiments, the outlet flow perturbing member 7 extends transversally relative to the axial extending direction I of the heating tube and comprises a plurality of flow through-openings 70. In certain particular non-limiting embodiments, the flow-through openings are directed in many directions I1, I2, I3, I4, I5, I6, I7, I8 converging towards a mixing chamber 75, such as formed by a recess of the flow perturbing member 7 and the outlet connector 4, positioned downstream of the flow perturbing member. The convergence of the openings in a mixing chamber, such as (but not limited to) towards its centerline, enables to homogenize the temperature of the liquid exiting the heating tube before it reaches the temperature sensor 5.

Of course, the recess 75 could be formed partially or entirely in the outlet connector and the outlet flow perturbing member could be a relatively flat disc-shaped insert. The outlet flow perturbing member 7 could also be an integral part of the outlet connector, in particular, be integral to the tubular connection portion 41.

More particularly, the outlet flow through-openings comprise entry hole areas 71 distributed along a first circle C3 of diameter D3 and exit hole areas 73 distributed along a second circle C4 of diameter D4 which is smaller the diameter than the first circle C3. In the illustrated particular (but non limiting) mode, the outlet flow perturbing member 7 comprises a conical portion 76 extending towards the interior of the flow passage 20 of the tube to promote the mixing of the central layer of liquid with the outer layer of liquid at the outlet end of the passage, as well as the distribution and orientation of the through-openings in the converging configuration. The wall member can further extend by a cylindrical portion 77 to delimit internally downstream the mixing cavity 75 and so provide enough space for housing at least part of the temperature sensor. The conical portion 76 could have other equivalent forms such as convex (e.g., hemispherical) or pyramidal. In certain non-limiting embodiments, the diameters of the holes are equal or higher than the diameter of the outlet end to not create an artificial restriction of the flow.

Figure 4:
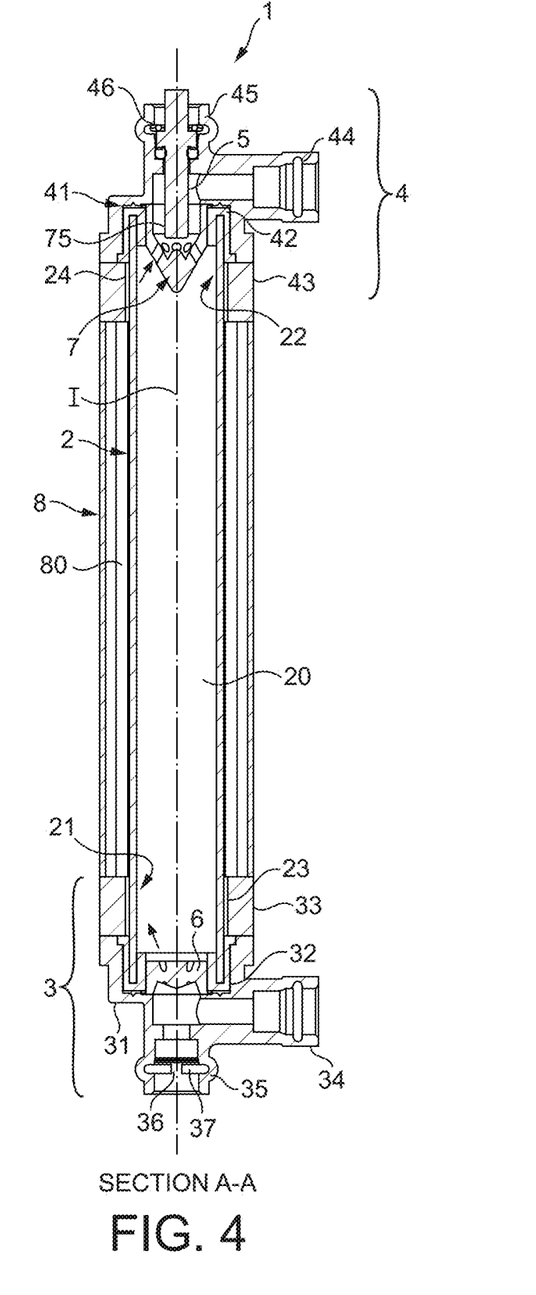
FIG. 4 is a cross-sectional view A-A of the instant tube heater of FIG. 3.

In certain non-limiting embodiments, the temperature sensor 5, such as (but not limited to) a NTC probe, extends partially through the mixing chamber 75 as illustrated in FIG. 4. However it can be possible to place the temperature sensor elsewhere in the flow of the liquid exiting the heating tube 2 such as through or across the external connection portion 44 of the outlet connector 4.

In certain non-limiting embodiments, the heating tube 2 is a glass tube heater, such as a quartz glass tube, coated with material or materials comprising resistance heating properties. The tube is generally coated externally. It may comprise thereon two electrodes 23, 24, e.g., silver rings, on the inlet and outlet ends 21, 22 respectively. The film can be tin antimony oxide or the like. The film can be coated by any suitable technique such as by immersion, hot spray, evaporation or magnetic sputtering. The advantage of such glass tube heater is that it provides an instant heating and is relatively easy to regulate by powering the material(s) (e.g. film) on and off via the electrodes. In a variant, the heating tube can be a thick film heater, for instance.

Figure 18:
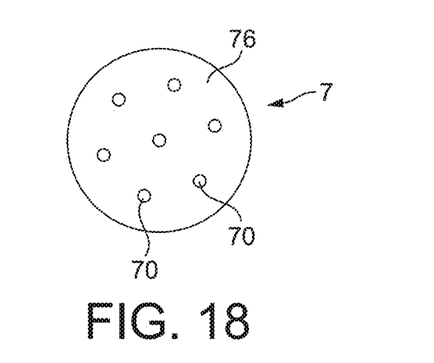
FIG. 18 is a plane view of the entry side of a variant of the outlet perturbing member.
Figure 19:
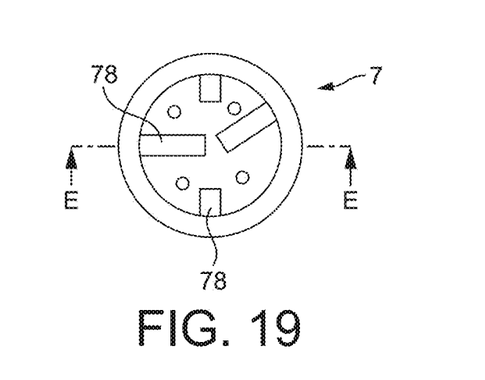
FIG. 19 is a plane view of the exit side of the outlet flow perturbing member of FIG. 18.
Figure 20:
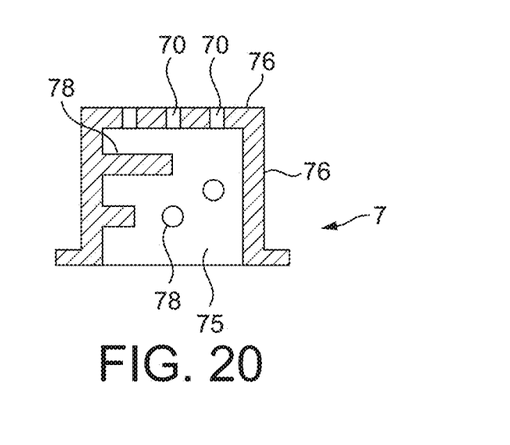
FIG. 20 is a cross section view E-E of the outlet flow perturbing member of FIGS. 18 and 19.

In a possible variant of the presently disclosed and/or claimed inventive concept(s), the outlet flow perturbing member 7 can be of a different configuration as illustrated in FIGS. 18 to 20. Outlet flow through-openings may be provided in a transversal wall portion 76 and oriented unidirectionally, e.g., parallel to the central axis I, and the mixing of the heated liquid in the mixing chamber 75 can be obtained by a plurality of obstacles 78 directed transversally to the direction of the through-openings such as a plurality of transversal rods distributed on the inner tubular surface of the mixing chamber. The cylindrical portion of the flow perturbing member is an example and may take other possible forms (e.g., a trunk of cone or pyramidal). Of course, the flow through-openings could be directed otherwise such as in a converging fashion as in the preceding mode of FIGS. 11-16. The cylindrical portion can also here be conical or pyramidal.

Figure 21:
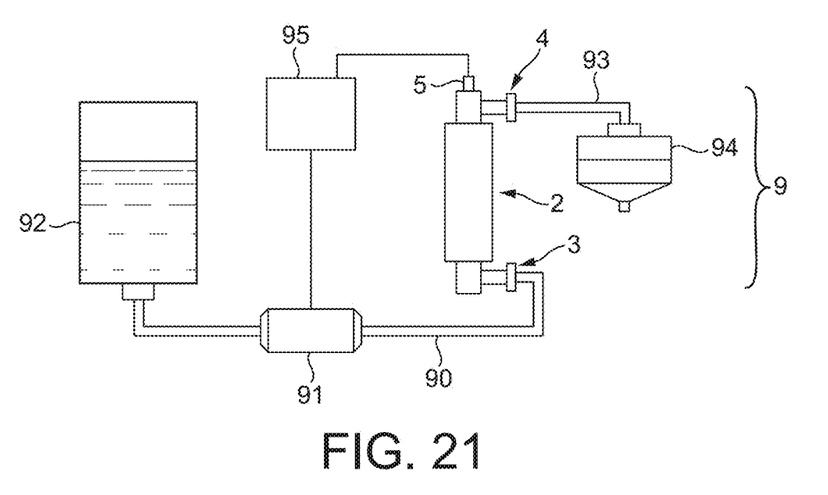
FIG. 21 shows a schematic view of a beverage preparation machine comprising an instant tube heater of the present presently disclosed and/or claimed inventive concept(s).

FIG. 21 illustrates in schematic manner a beverage preparation machine 9 comprising an instant tube heater 1 as described in the present application. In particular (but non-limiting) embodiments, the beverage preparation machine 9 comprises an ambient or cold liquid supply line 90 comprising a liquid supply pump 91 connected upstream to a reservoir of liquid 92, such as a water tank. The machine further comprises a heated liquid supply line 93 connected to a beverage preparation chamber 94, such as a capsule or pod receiving chamber or a beverage filter receiver. The inlet connector 3 and the outlet connector 4 of the instant heater of the presently disclosed and/or claimed inventive concept(s) are sealingly connected respectively to the ambient or cold liquid supply line 90 and to the heated liquid supply line 93. The machine further comprises a control unit 95 arranged for receiving temperature input from the temperature sensor 5 and for controlling the liquid supply pump 91 as a result of the temperature input. For this, the control unit generally comprises a processor and a memory for storing one or more temperature set points compared to the temperature sensed from the temperature sensor. The temperature set point(s) may be closely determined to correspond to a particular type of beverage to be prepared such as coffee or tea. The liquid supply pump 91 can be regulated by powering it selectively on and off or if it is a pump with variable flow rate by varying power or current.

It should be noted that the beverage machine can be a hot water dispenser in which the beverage preparation chamber is omitted and possibly replaced by a hot water dispensing valve which opening and closing may be automatically controlled by the control unit.

The invention claimed is:
1. An instant tube heater for heating liquid comprising:
a hollow heating tube comprising a tubular flow passage extending along a central axis for heating the liquid as the liquid flows through the hollow heating tube,
an inlet connector sealingly connected to an inlet end of the hollow heating tube,
an outlet connector sealingly connected to an outlet end of the hollow heating tube,
a temperature sensor connected to the outlet connector configured to sense the temperature of the liquid leaving the hollow heating tube,
wherein an inlet flow deviating member is positioned locally at the inlet end of the hollow heating tube and is configured for forcing the flow of the liquid entering the tubular flow passage of the hollow heating tube in at least one direction away from the direction of the central axis of the tubular flow passage,
the inlet flow deviating member comprises an entry surface positioned for the liquid from the inlet connector to enter the inlet flow deviating member, the entry surface extends inward from sidewalls of the inlet flow deviating member towards the central axis of the hollow heating tube, and the inlet flow deviating member further comprises an exit surface at an opposite end of the inlet flow deviating member from the entry surface, the exit surface positioned for the liquid to enter the tubular flow passage from the inlet flow deviating member,
the inlet flow deviating member comprising entry hole areas, the entry hole areas extending from inlet holes distributed on the entry surface along a first circle of a first diameter to exit holes distributed on the exit surface along a second circle of a second diameter larger than the first diameter, at least one of the entry surface or the exit surface is perpendicular to the sidewalls;
the instant tube heater further comprises: (i) a mixing member between the hollow heating tube and the temperature sensor, wherein the mixing member comprises an outlet flow perturbing member positioned at the outlet end of the hollow heating tube, (ii) a mixing chamber positioned between the outlet flow perturbing member and the outlet connector, and (iii) the temperature sensor, which is positioned to extend at least partially inside the mixing chamber.

2. The instant tube heater according to claim 1, wherein the inlet flow deviating member comprises a wall which extends transversally relative to the central axis of the hollow heating tube and which comprises a plurality of inlet flow through-openings.

3. The instant tube heater according to claim 2, wherein the plurality of inlet flow through-openings are directed in a plurality of different directions diverging from the direction of the central axis towards an inner surface of the hollow heating tube and/or converging with the central axis.

4. The instant tube heater according to claim 2, wherein most of the plurality of inlet flow through-openings are off-centered and further oriented in directions which are inclined relative to the central axis which is axially extending, and relative to radial planes of the hollow heating tube.

5. The instant tube heater according to claim 2, wherein the number of the plurality of inlet flow through-openings is between 3 and 10.

6. The instant tube heater according to claim 1 wherein the outlet flow perturbing member comprises a wall which extends transversally relative to the central axis of the hollow heating tube and which comprises a plurality of outlet flow through- openings.

7. The instant tube heater according to claim 6, wherein most of the plurality of outlet flow through-openings are directed in a plurality of different directions converging with the temperature sensor and/or with a centre of the mixing chamber.

8. The instant tube heater according to claim 1, wherein the outlet flow perturbing member is comprised of a solid heat resistant plastic.

9. The instant tube heater according to claim 1, wherein the outlet flow perturbing member extends transversally, relative to the direction of the central axis of the hollow heating tube.

10. The instant tube heater according to claim 1, wherein the mixing member comprises a rotating blade.

11. The instant tube heater according to claim 1, wherein the outlet flow perturbing member is a relatively flat disc-shaped insert.

12. The instant tube heater according to claim 1, wherein the temperature sensor is an NTC probe.

13. The instant tube heater according to claim 1, wherein the hollow heating tube is selected amongst: a glass tube coated with material(s) having resistance heating properties such as an electro-thermal film, or a thick film.

14. The instant tube heater according to claim 1, wherein the instant tube heater comprises an outer casing connected respectively to the inlet and outlet connectors and separated from the hollow heating tube by an annular gap.

15. The instant tube heater according to claim 1, wherein the outlet flow perturbing member extends conically relative to the direction of the central axis of the hollow heating tube.

16. The instant tube heater according to claim 1, wherein the length of the inlet flow deviating member. is less than 5% of a total axial length of the tubular flow passage.

17. A beverage preparation machine comprising:
an ambient liquid supply line comprising a liquid supply pump connected to a reservoir of liquid;
a heated liquid supply line connected to a beverage preparation chamber; and
an instant tube heater for heating flowing liquid comprising a hollow heating tube comprising a tubular flow passage extending along a central axis for heating the liquid as the liquid flows through the hollow heating tube,
an inlet connector sealingly connected to the ambient liquid supply line and an inlet end of the hollow heating tube,
an outlet connector sealingly connected to the heated liquid supply line and an outlet end of the hollow heating tube,
a temperature sensor connected to the outlet connector configured to sense the temperature of the liquid leaving the hollow heating tube,
wherein an inlet flow deviating member is positioned locally at the inlet end of the hollow heating tube and is configured for forcing the flow of the liquid entering the tubular flow passage of the hollow heating tube in at least one direction away from the direction of the central axis of the tubular flow passage
the inlet flow deviating member comprises an entry surface positioned for the liquid from the inlet connector to enter the inlet flow deviating member, the entry surface extends inward from sidewalls of the inlet flow deviating member towards the central axis of the hollow heating tube, and the inlet flow deviating member further comprises an exit surface at an opposite end of the inlet flow deviating member from the entry surface, the exit surface positioned for the liquid to enter the tubular flow passage from the inlet flow deviating member,
the inlet flow deviating member comprising entry hole areas, the entry hole areas extending from inlet holes distributed on the entry surface along a first circle of a first diameter to exit holes distributed on the exit surface along a second circle of a second diameter larger than the first diameter, at least one of the entry surface or the exit surface is perpendicular to the sidewalls;
the instant tube heater further comprises: (i) a mixing member between the hollow heating tube and the temperature sensor, wherein the mixing member comprises an outlet flow perturbing member positioned at the outlet end of the hollow heating tube, (ii) a mixing chamber positioned between the outlet flow perturbing member and the outlet connector, and (iii) the temperature sensor, which is positioned to extend at least partially inside the mixing chamber.

18. The beverage preparation machine according to claim 17, wherein the length of the inlet flow deviating member is less than 5% of a total axial length of the tubular flow passage.

* * * * *